United States Patent
Peters et al.

(10) Patent No.: US 6,219,411 B1
(45) Date of Patent: Apr. 17, 2001

(54) PERSONAL COMPUTER ASSISTED MULTIPLE LINE ACCESS

(75) Inventors: Daniel V. Peters, Lisle, IL (US); Julie M. Owen, Broomfield, CO (US); David C. Harms, West Chicago, IL (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/955,099

(22) Filed: Oct. 22, 1997

(51) Int. Cl.[7] .................................................. H04M 13/00
(52) U.S. Cl. ........................................... 379/177; 379/171
(58) Field of Search ................................. 379/142, 156, 379/157, 158, 159, 160, 161, 164, 167, 170, 171, 172, 177, 166, 180

(56) References Cited

U.S. PATENT DOCUMENTS

| | | | |
|---|---|---|---|
| 5,086,458 | * | 2/1992 | Bowen .................................. 379/180 |
| 5,530,951 | * | 6/1996 | Argintar ................................ 379/167 |
| 5,550,900 | * | 8/1996 | Ensor et al. ............................ 379/67 |
| 5,809,111 | * | 9/1998 | Matthew ............................... 379/156 |
| 5,881,143 | * | 3/1999 | Johnson ................................ 379/177 |
| 5,887,054 | * | 3/1999 | Burke et al. .......................... 379/159 |
| 5,933,775 | * | 8/1999 | Peters ................................... 379/167 |

* cited by examiner

*Primary Examiner*—Curtis Kuntz
*Assistant Examiner*—Rexford N. Barnie
(74) *Attorney, Agent, or Firm*—Ying Tuo; Kenneth M. Berner

(57) ABSTRACT

An integrated computer-telephone system includes a personal computer and a plurality of telephone sets. Each of the telephone sets is coupled to multiple telephone lines via respective adapters. By activating a line button on an adapter, a respective telephone will be connected to a selected line to answer or place a call on the selected line. The integrated computer-telephone system enables the multiple telephone line access by using existing standard telephone sets in a house hold. The integrated computer-telephone system is able to control the access to the multiple telephone lines according to their operational status and to preventing the telephone sets at other extensions from being connected to a telephone line when a call is in progress on the telephone line.

6 Claims, 10 Drawing Sheets

PERSONAL COMPUTER ASSISTED MULTIPLE LINE ACCESS

BACKGROUND OF THE INVENTION

The present invention generally relates to a telephone communication system, and in particular, to an in-home (or a small office) telephone communication system utilizing the capabilities of existing telephone equipment and existing phone wiring with the addition of a control computer.

Increasingly, many homes may have one or more telephone wires and a modern PC with advanced features. With increasing performance needs and expectations on home telephone systems, more and more consumers are demanding that the home telephone systems have more intelligence and processing capabilities at an affordable price. Thus, applicants have realized there is a large market potential to use modem PC's processing power to provide home telephone system with advanced home telephony features, including:

(1) caller ID announcement based on caller ID record, (2) voice activated auto-dial, (3) PC resident message center access from any PCIP equipped phone, (4) routing of incoming calls to specific phones in the home, (5) in-house intercom with no additional wiring of the home, (6) screening of incoming messages from any PCIP equipped phone, (7) home convenience package including list maker and scheduler, (8) speech recognition by using the PCIP system, (9) multiple line access, etc.

This application specifically relates to the feature of personal computer assisted multiple line access. The other features are described in U.S. patent application Ser. No. 08/766,121 filed Dec. 16, 1996 (now abandoned); U.S. patent application Ser. No. 08/767,045, filed Dec. 16, 1996 (now pending); U.S. patent application Ser. No. 08/767,046, filed Dec. 16, 1996 (now abandoned); U.S. patent application Ser. No. 08/766,120, filed Mar. 24, 1998 (now abandoned); U.S. patent application Ser. No. 08/767,044, filed Dec. 16, 1996 (now abandoned); U.S. patent application Ser. No. 08/767,043, filed Dec. 16, 1996 (now abandoned); U.S. patent application Ser. No. 08/766,122 filed Dec. 16, 1996 (now abandoned); and U.S. patent application Ser. No. 08/766,123, filed Dec. 16, 1996 (now abandoned) which are incorporated into this application by reference.

Applicants have also realized that the feasibility to achieve such market potential greatly relies on an effective design of an integrated computer-telephone system:

(1) that has a low cost, (2) that is flexible to form a specific telephone system for a household, (3) that is adaptable to existing telecommunication technology, (4) that is adaptable to consumer's existing telephone equipment and house wiring, (5) that is simple to install, and (6) that does not interfere with regular operation of existing home telephone system.

In a typical house, when a telephone company installs multiple lines, they are available at all phone jacks throughout the house. However, the existing telephone sets in the house may not have multiple-line access capability, and the user may not be willing to replace the existing telephone sets. Furthermore, with the multiple telephone lines in the house, it is desirable to dedicate one or more telephone lines to certain types of calls, such as the calls in business nature or data mode calls, at certain periods of time. Because the multiple lines are available at all phone jacks throughout the house, a dedicated call can be interrupted by the telephone sets at other extensions distributed in different rooms.

Therefore, there is a need to provide an integrated computer-telephone system that enables users to get access to multiple telephone lines without requiring to replace existing home telephone sets.

There is another need to provide an integrated computer-telephone system that is capable of managing access to the multiple telephone lines.

There is yet another need to provide an integrated computer-telephone system with the feature of preventing other telephone sets at other extensions from disrupting a telephone line when a call is in progress on the telephone line.

The present invention provides the method and apparatus to meet these needs.

SUMMARY OF THE INVENTION

In one aspect, the present invention provides an apparatus for selecting a communication line from a plurality of communication lines. Each of the plurality of communication lines is coupled to a plurality of communication devices. The apparatus comprising:

a control processor, coupled to one of the communication lines, for generating commands to control the communication devices;

a switching circuit, coupled between one of said communication devices and the communication lines, for selectively connecting said one communication device to one of the communication lines; and an executing processor, coupled to said one communication device and said switching circuit, for executing said commands to control said switching circuit, so that said one communication device can be connected to said one communication line.

In another aspect, the present invention provides an apparatus for selecting a communication line from a plurality of communication lines. Each of the plurality of communication lines is coupled to a plurality of communication devices. The apparatus comprising:

a control processor, coupled to one of the communication lines, for generating commands to control the communication devices based on operational status of the communication lines;

a switching circuit, coupled between one of said communication devices and the communication lines, for selectively connecting said one communication device to one of the communication lines; and a line selecting control circuit, coupled to said one communication device and said one communication line, for generating a request to select said one communication line so that said one communication device can be connected to said selected one communication line;

wherein, in response to said request, said control processor allows and denies an access to said selected one communication line based on the operational status of said selected one communication line.

The present invention also provides respective methods corresponding to the two aspects mentioned above.

BRIEF DESCRIPTION OF THE DRAWINGS

The above and other features, and advantages of the present invention will become apparent from the following description and attached drawings, in which:

FIG. 3 (including 3A and 3B) shows the PC interactive phone (PCIP) system of FIG. 1 in greater detail, in accordance with the present invention;

4

DETAILED DESCRIPTION OF THE PREFERRED EMBODIMENT

The following description is presented to enable any person skilled in the art to make and use the invention, and is provided in the context of a particular application and its requirements. Various modifications to the preferred embodiment will be readily apparent to those skilled in the art, and the principles defined herein may be applied to other embodiments and applications without departing from the spirit and scope of the invention. Thus, the present invention is not intended to be limited to the embodiment shown, but is to be accorded with the broadest scope consistent with the principles and features disclosed herein.

Figure 1:
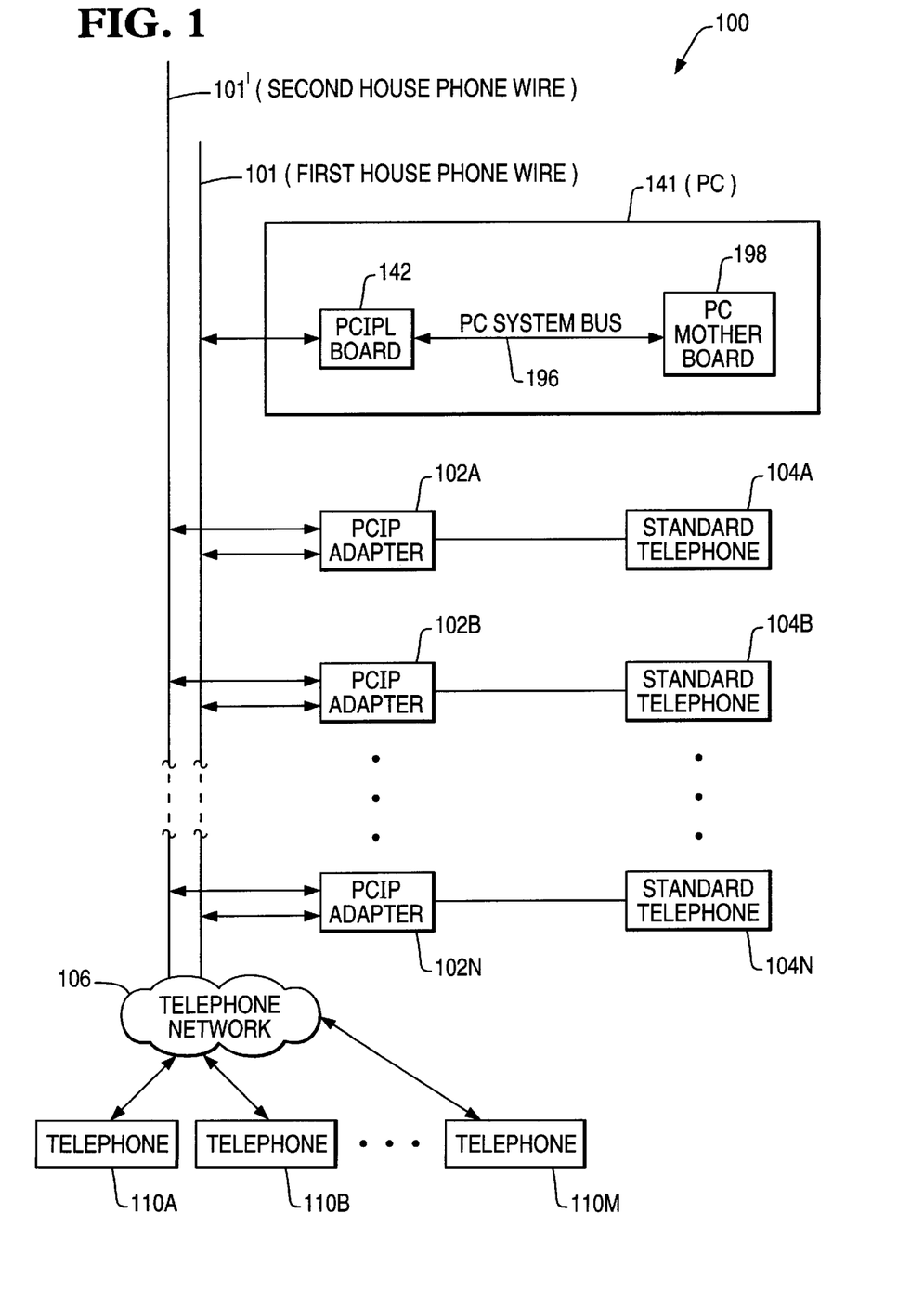
FIG. 1 is a block diagram of a PC interactive phone (PCIP) system, in accordance with the present invention.

Referring to FIG. 1, there is shown a block diagram of a PC interactive phone (PCIP) system, in accordance with the present invention.

The PC interactive phone system includes two house telephone lines 101 and 103, a PC 141, a plurality of telephone sets (identified as 104A, 104B, 104N), and a plurality of PCIP adapters (identified as 102A, 102B, . . . , 102N). Each of the telephone sets is coupled to its respective PCIP adapter (PCIPA). These telephone sets can be standard ones without any advanced features. Via telephone network 106, each of telephone sets 104A, 104B, . . . , 104N can communicate with telephone sets 110A, 110B, . . . , or 110M.

As shown in FIG. 1, PC 141 includes a PC mother board 198 and an add-in PCIP link (PCIPL) board 142. Other detailed aspects of a typical PC are not described here because they are known to the people in the art. PCIPL board 142 is coupled to PC mother board 198 via PC system bus 196. An example of a typical modern system bus is the PCI local bus. The PCIPL board is coupled to house telephone line 101, and the plurality of PCIP adapters can be selectively coupled to house telephone line 101 or 103.

Figure 2:
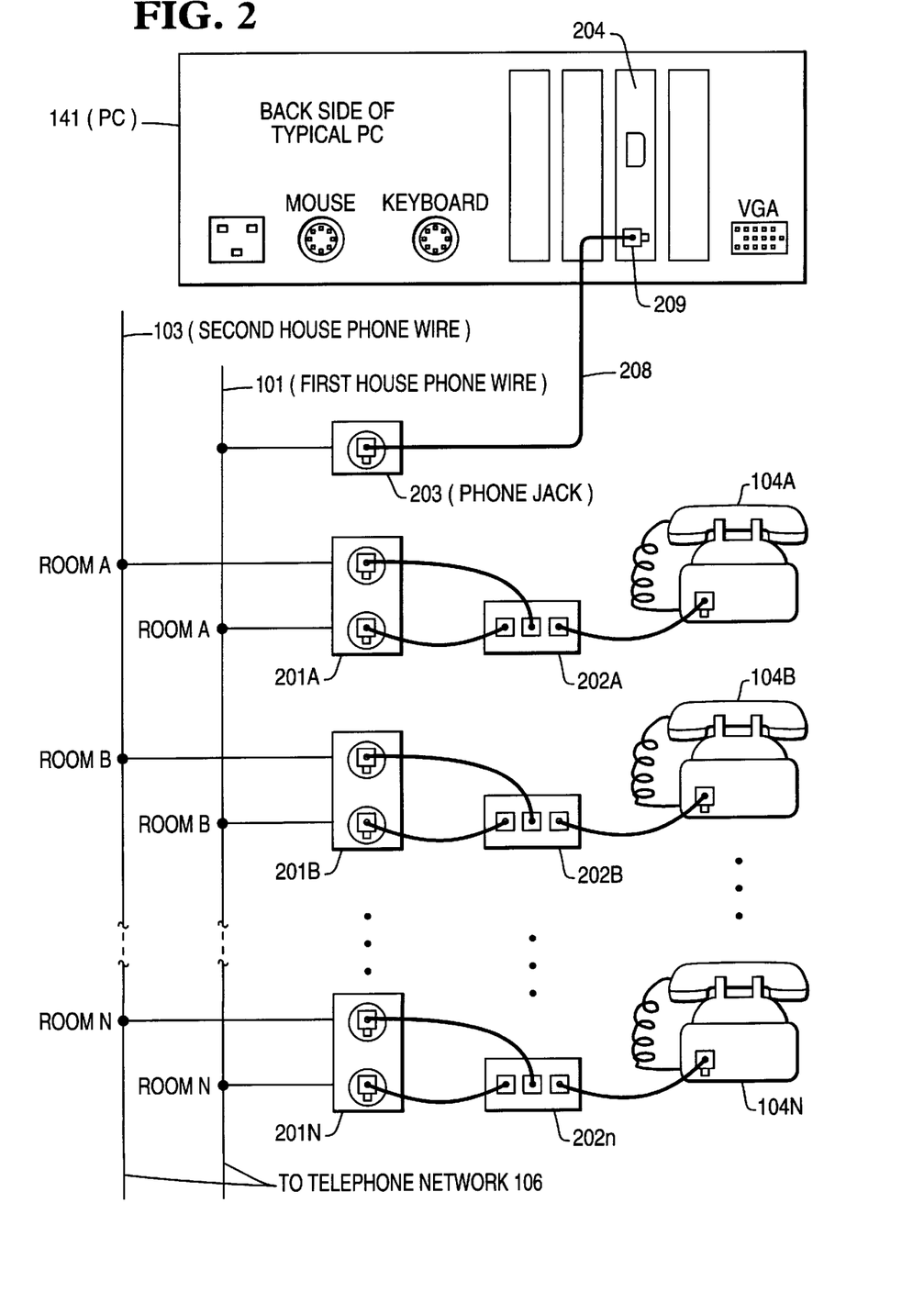
FIG. 2 shows house wiring of a telephone line and installation scheme for the PC interactive phone (PCIP) system shown in FIG. 1, in accordance with the present invention.

Referring to FIG. 2, there is shown house wiring of telephone lines 101 and 103 and an installation scheme for the PC interactive phone (PCIP) system shown in FIG. 1, in accordance with the present invention.

As shown in FIG. 2, PC 141 has a slot 204, generally allowing access for miscellaneous PC add-in boards, into which PCIPL board 142 is inserted. Telephone lines 101 and 103 are wired into rooms 1-N, where telephone jacks 203, 201A, 201B, . . . , 201N are installed respectively.

Via connector 209 and a connectorized telephone wire 208, PCIPL board 142 is coupled to telephone jack 203.

Figure 4:
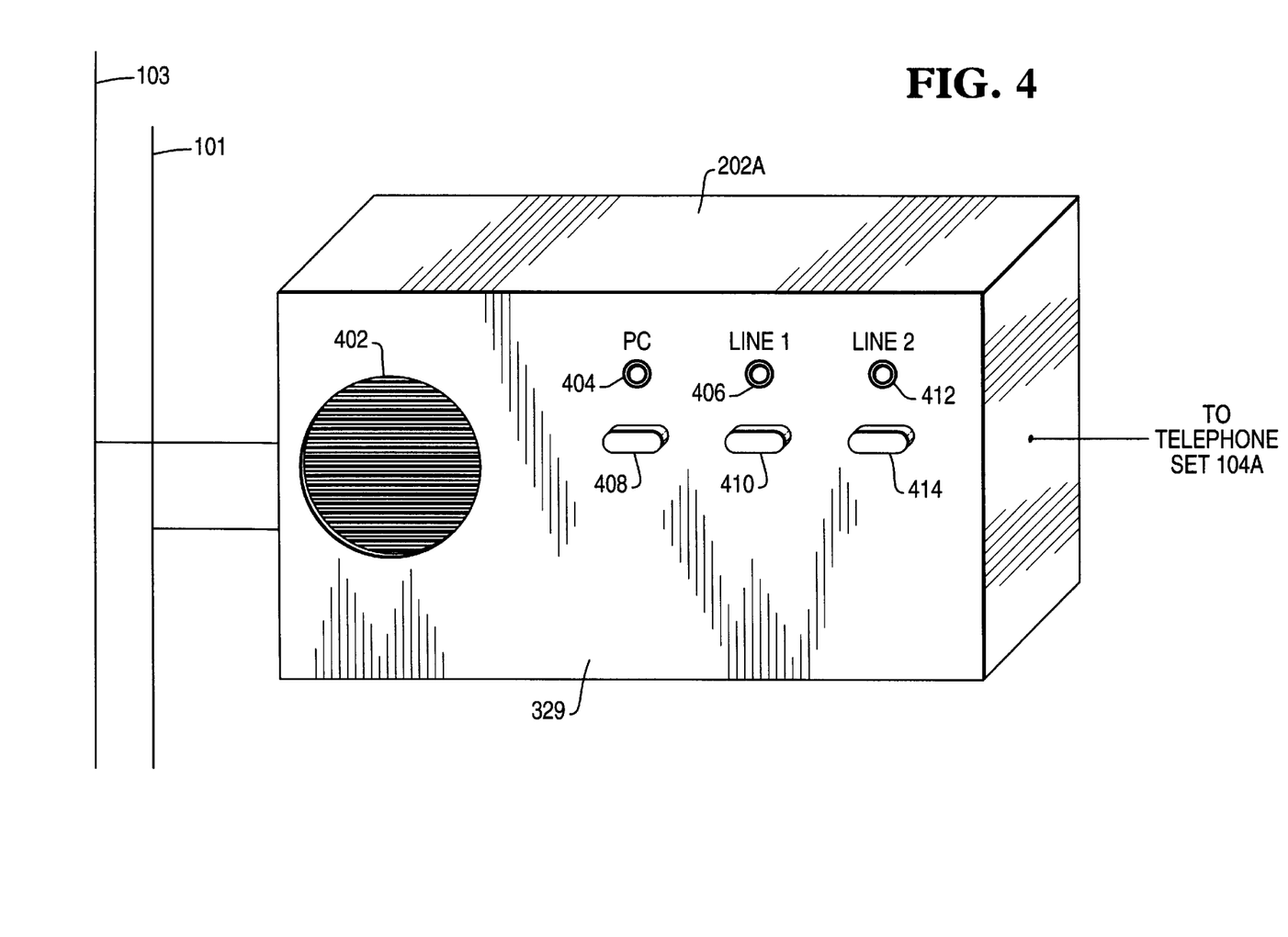
FIG. 4 shows the user panel of FIG. 3 in greater detail.

A plurality of adapter boxes (202A, 202B, . . . , 202N) are coupled to telephone jacks 201 A, 201 B, . . . , 201 N, respectively. The telephone sets (104A, 104B, . . . , 104N) are coupled to adapter boxes 202A, 202B, . . . , 202N, respectively. Installed within adapter boxes 202A, 202B, . . . , 202N are PCIP adapters 102A, 102B, . . . , 102N, respectively. Each of the adapter boxes has a user panel which is depicted in FIG. 4 in greater detail.

To users, the system consists of just a few elements, some of which they may already have. FIG. 2 shows how simply these elements are interconnected.

Figures 3, 3A:
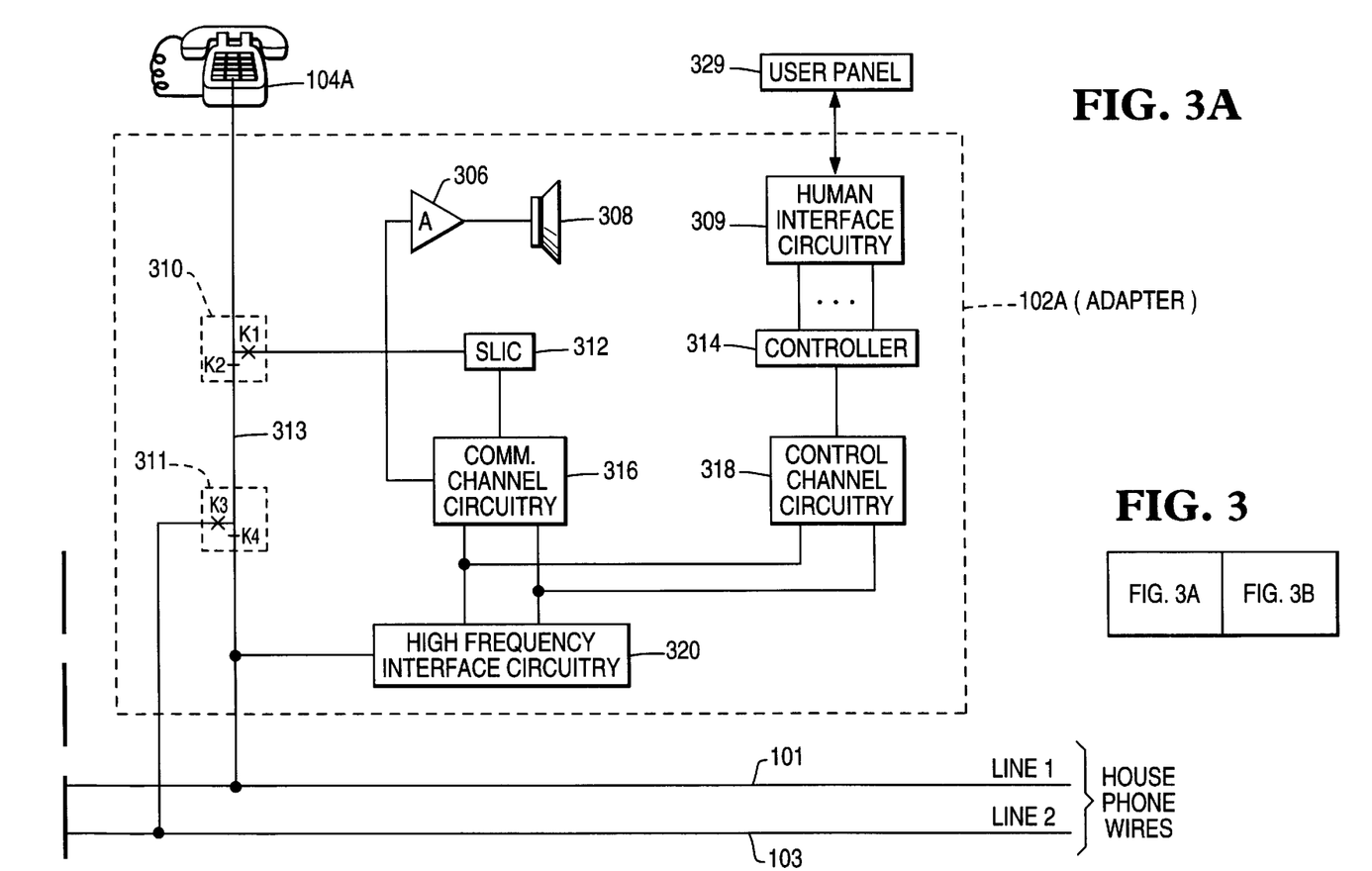

Referring to FIG. 3 (including 3A and 3B), there is shown the embodiment of the PC interactive phone (PCIP) system of FIG. 1 in greater detail, in accordance with the present invention.

Depicted in FIG. 3A as a representative of the plurality of PCIP adapters (102A, 102B, . . . , 102N), PCIP adapter 102A includes an amplifier 306, a speaker 308, a human interface circuitry 309, two relays 310 and 311, a subscriber loop interface (SLIC) 312, a controller 314, a communication channel circuitry 316, a control channel circuitry 318, and a high frequency interface circuitry 320. Coupled to human interface circuitry 309 is a user panel 329.

Speaker 308, coupled to communication channel circuitry 316 via amplifier 106, is able to project audio to PCIP adapter locations in the home as needed by the PCIP system.

SLIC 312, coupled between communications channel circuitry 316 and telephone 104A via K1 switch located within relay 310, is able to power telephone set 104A, to detect off-hook condition for telephone set 104A, to adjust the proper bias and amplitude to send an audio signal to and receive audio signal from telephone set 104A, to adjust the proper bias and amplitude to send an audio signal to and receive an audio signal from the communications channel circuitry 316, and to convert a 4-wire-send-and-receive signaling arrangement on the communications channel side to a 2-wire-send-and-receive signaling arrangement that is appropriate to a telephone set. The off-hook detect capability within the SLIC 312 is used by the PCIP system to initiate a "listen" response whenever a telephone handset gets picked up. Modem SLIC circuits are highly integrated devices that can be purchased from a number of suppliers.

Under control of controller 314, relay 310 is able to selectively connect telephone set 104A to a telephone line via the PCIPA circuits in adapter 102A, or to a telephone line bypassing the PCIPA circuits in adapter 102A; relay 311 is able to selectively connect line 313 to telephone line 101 or telephone line 103.

Human interface circuitry 309, coupled to controller 314, is able to generate currents to light the LEDs on user panel 329 in response to control signals from controller 314, and to generate service request signals to controller 314 in response to activations of the function buttons on user panel 329.

In adapter 102A, as an embodiment, communication channel circuitry 316, coupled to SLIC 312, includes two high frequency communication channels: a high frequency transmitter and a high frequency receiver. The high frequency transmitter combines low frequency audio from SLIC 312 with a high frequency carrier that can be coupled onto the home telephone wires in a non-interfering manner using the high frequency interface circuitry 320. The high frequency receiver recovers low frequency audio from a high frequency carrier on the house telephone wires and sends it either to SLIC 312 or to speaker 306 and amplifier 308, depending on control signals communicated through the controller 314. The two high frequency communication channels are used as a full duplex audio (e.g., simultaneous audio transmission and reception) channel to another adapter, or to PC 141 (via the two communication channels located within PCIPL board 142). For example, in one direction, the user can communicate to Speech recognition software 604 on PC 141. In the other direction, PC 141 can play audio clips to speaker 308 at PCIP adapter 102A or to telephone set 104A. Depending on the various operating modes of the PCIP system, these two frequencies are re-configurable to either transmitter or receiver functions under control of PCIPA controller 314.

Control channel circuitry 318 can encode and decode binary sequences using a third high frequency carrier (distinct from the two communication channels described in the previous paragraph). The control channel circuit 318 is connected to controller 314 which facilitates a multi-point network using a single carrier frequency. Controller 314 has a networking port capable of transmitting and receiving Manchester encoded digital information, which eliminates the need for a separate clock signal. Controller 314 also uses a collision sensing and back-off algorithm that resolves contention for the network. The control channel frequency can be coupled onto the house telephone wires in a non-interfering manner using high frequency interface circuitry 320. The encode side of control channel circuit 318 converts a binary "1" and "0" sequence from controller 314 to a "carrier on" and "carrier off" sequence. The decode side of control channel 318 circuit converts a "carrier on" and "carrier off" sequence to a binary "1" and "0" sequence to be sent to controller 314.

High frequency interface circuitry 320, which connects communication channel circuitry 316 and control channel circuitry 318 to telephone line 101, is able to couple a high frequency carrier from circuitries 316 and 318 to telephone line 101, without interfering with the normal audio band signal transmission on the telephone line. High frequency interface circuitry 320 can also receive high frequency signals from the telephone line.

Controller 314 is specialized for implementation of distributed sense and control networks. It includes a networking port, a configurable input/output port, and hardware and firmware that allow execution of simple programs for sense and control and communications protocols. The input/output port provides access to human interface circuitry 309 and it controls various communications path options within the PCIPA circuit. For example, the input/output port is able to control the states of relays 310 and 311 (energizing or un-energizing K1, K2, K3 and K4), to generate signals to light the LEDs on user panel 329, to detect a button activation on user panel 329, to monitor the off-hook detect signal from SLIC 312, and to switch the communication channel receiver output between speaker amplifier 306 and SLIC 312. The networking port that is integrated into controller 314 allows it to send requests (or status reports) to and receive control commands from PC 141, for example, to send a service request to PC 141 after a specific button on user panel 329 has been activated. Specifically, the controller networks with the PC and other PCIPA controllers using data packets across the control channel. The Manchester encode and decode circuits that generate and sense the "1" and "0" bits are also integrated into the controller. Controller 314 also has a collision detect and back-off algorithm that resolves contention and allows multi-node access to the carrier. The specific device that currently suits this application is a Lon Works Neuron chip, MC143120 available from Motorola and Toshiba.

Figure 3B:
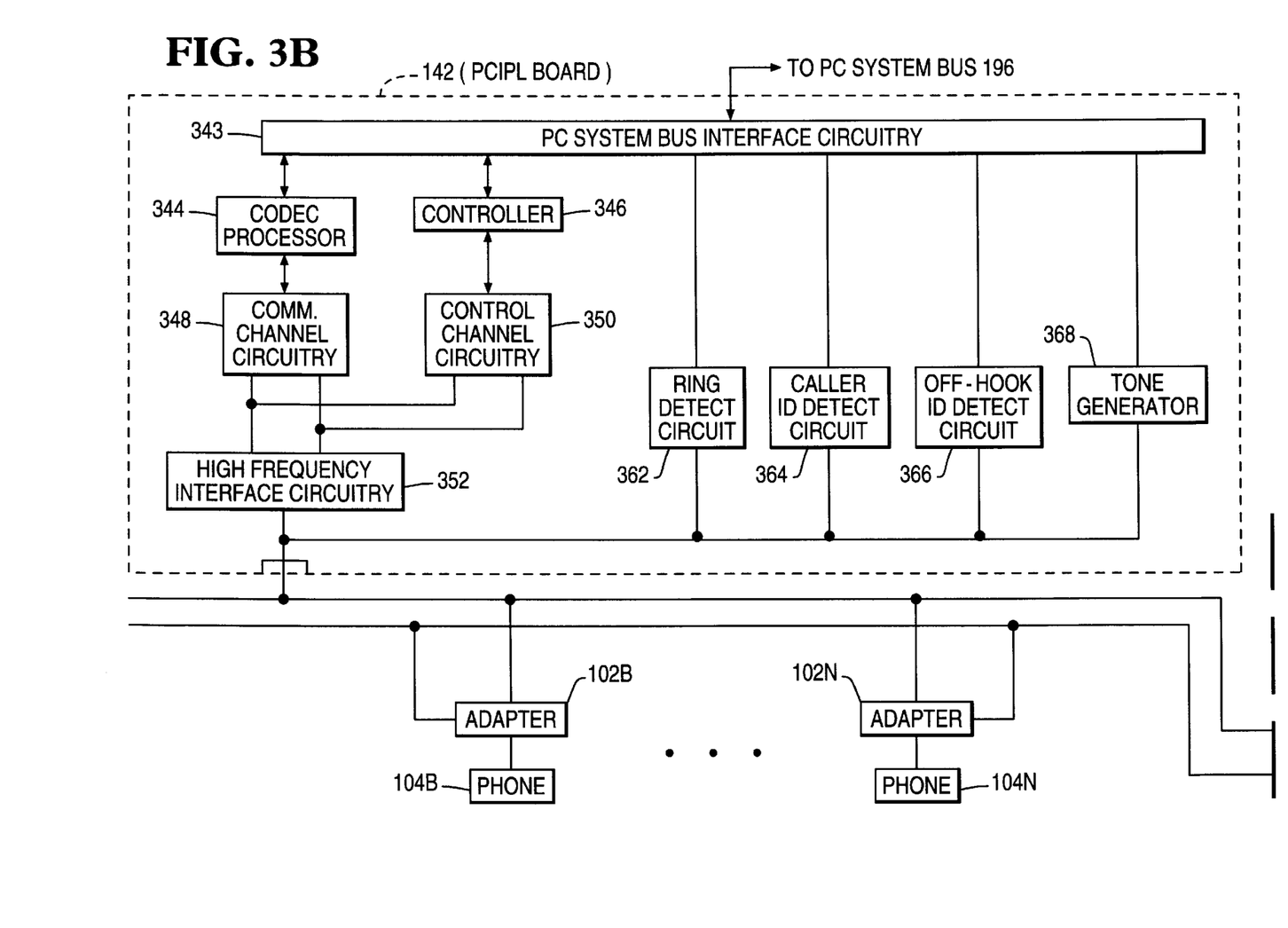

As shown in FIG. 3B, PCIPL board 142 includes a PC system bus interface circuitry 343, a CODEC (coder/decoder) processor 344, a controller 346, a communication channel circuitry 348, a control channel circuitry 350, a high frequency interface circuitry 352, a ring detect circuit 362, a caller ID detect circuitry 364, an off-hook detect circuit 366, and a tone generator 368.

PC system bus interface circuitry 343, coupled to PC system bus 196, is able to transmit signals between PC system bus 196 and the other circuitries on PCIPL board 142.

CODEC processor 344, coupled to PC system bus interface circuitry 343, is able to convert digitally encoded audio from PC system bus 196 to analog audio and send the converted digital audio to communication channel circuitry 348. It is also able to convert analog audio from communication channel circuitry 348 to digital audio and send the converted analog audio to PC 141.

Controller 346 has similar structure and function as controller 314 described for PCIP adapter 102A. It is specialized for implementation of distributed sense and control networks. It includes a networking port, a configurable input/output port, and hardware and firmware that allow execution of simple programs for sense and control and communications protocols. The input/output port in this case connects to PC system bus interface circuit 343 and provides a parallel port for communicating with the PC circuit. Controller 346 is coupled between PC system bus interface circuitry 343 and control channel circuitry 350, and is thus able to provide network access for the PC to generate control commands to, and interpret service requests and operational reports from, the adapters (102A, 102B, . . . , 102N).

On PCIPL board 142, communication channel circuitry 348 has two high frequency communication channels, which are mainly used to flexibly establish full duplex audio channels between CODEC processor 344 and the PCIP adapters (102A, 102B, . . . , 102N). Only one PCIP adapter will be allowed to transmit on either of the two communication channels at any time as controlled by PCIP control program 602. The function and structure of communication channel circuitry 348 are similar to those of communication channel 316 in the above-described PCIP adapter 102A.

Control channel circuitry 350 has one channel, which is mainly used to send control commands to, and receive service requests and operational reports from, the adapters (102A, 102B, . . . , 102N). The function and structure of control channel circuitry 350 are similar to those of control channel circuitry 318 in the above-described PCIP adapter 102A.

High frequency interface circuitry 352, which connects communication channel circuitry 348 and control channel circuitry 350 to telephone line 101, is able to couple the high frequency carrier from circuitries 348 and 350 to the telephone line, without interfering with the normal audio band signal transmission on the telephone line. High frequency interface circuitry 352 can also receive high frequency signals from the telephone line.

Ring detect circuit 362 is able to detect ring currents on the telephone line.

Caller ID detect circuit 364 is able to detect caller's identification information (minimally, a caller's telephone number). This information is carried between first and second ring currents of an incoming call when caller ID service has been purchased from the local phone company.

Off-hook detect circuit 366 is able to detect a change in line impedance associated with an off-hook condition. Three examples of off-hook condition are:

1. any of the non-PCIP equipped telephones connected to the telephone line has the handset lifted,
2. any of the PCIP equipped telephones has the handset lifted and relays 310 and 311 have the phone connected to the house phone wires, or
3. any other equipment on the phone line such as a FAX or answering machine "picks up" a call.

Tone generator 368 is to able to convert a telephone number to be dialed from a computer based representation, such as binary, into DTMF (dual tone multifrequency) tones that can be superimposed onto the telephone line to affect autodialing.

Ring detect circuit 362, Caller ID detect circuit 364, Off-hook detect circuit 366 are known to the person skilled in the art. Thus, they will not be described in greater detail. The functions of CODEC processor 344 and tone generator 368 can be flexibly programmed into various digital signal processors (DSPs) available in the industry, an example of which is DSP 1634 processor made by AT&T.

It should be noted that, in the embodiment shown in FIG. 3, the three frequencies that are used to implement the communication and control channels in the PCIP system are out of the audio voice band and are in compliance with FCC rules, such that, the signaling of these three channels does not interface with normal communication and signaling on a telephone network, even when PCIP and normal telephone activities are in progress simultaneously.

Preferably, in the embodiment shown in FIG. 3, 312.5 KHz and 357.1 KHz are used for two communication channels and 416.7 KHz for one control channel. These three specific frequencies are chosen because they are between 540 KHz (the bottom of the AM broadcast band) and 270 KHz (the lowest frequency that can be used for compliance to part 68 Federal Communication Commission). These three frequencies are also multiples of 10 MHz, which makes them easy to generate without RC or L tunables.

In the embodiment as shown in FIG. 3, a communication channel between adapter 102A and PCIPL board 142 is formed by: PCIPA communication channel circuitry 316, PCIPA high frequency interface circuitry 320, house phone wire 101, PCIPL high frequency interface circuitry 352, and PCIPL communication channel circuitry 348. A control channel between adapter 102A and PCIPL board 142 is formed by: PCIPA control channel circuitry 318, PCIPA high frequency interface circuitry 320, house phone wire 101, PCIPL high frequency interface circuitry 352, and PCIPL control channel circuitry 350.

Unlike the conventional telephone communication system, the present invention uses two communication channels to achieve full duplex audio. In the conventional telephone communication, one set of wires achieves full duplex audio by using a hybrid transformer that separates transmitting from receiving in a telephone set. However, the method used in the conventional telephone communication is not feasible when audio is modulated in an out of voice band carrier, because, if both ends of a communication channel used the same carrier, the result would be a scrambled unrecoverable carrier.

In addition, unlike the conventional telephone communication system where a telephone office is usually either in audio transmission mode or in controlling mode (such as on-hook or off-hook signaling), the features provided by the adapters and PCIPL board 342 sometimes need to process audio transmission and control signals at the same time when multiple telephone sets connected to the telephone line are in use at the same time. Thus, in adapter 102A and PCIPL board 142, the communication channels are separated from the control channel.

In the embodiment shown in FIG. 3, the existing house telephone wiring is used as transmission medium for the three high frequency channels between the adapter 102A and PCIPL board 142. However, other transmission media can be used to implement these three channels, such as wireless or power line carrier.

Referring to FIG. 4, there is shown user panel 329 (which is mounted on the front of adapter box 202A) in greater detail, in accordance with the present invention. In the embodiment shown in FIG. 4, a "two line" implementation is depicted. But the principle in this embodiment is clearly applicable to three or more lines.

As shown in FIG. 4, user panel 329 includes a speaker opening 402, three LEDs (404, 406, and 412), and three buttons (408, 410, and 414). LED 404, which is associated with the label "PC" and button 408, indicates whether a communications link has been established between the attached telephone set and PCIP speech recognition software 604 (see FIG. 6) at PC 141, as would be the typical case after pressing button 408. LEDs 406 and 412 indicate the states of telephone lines 101 and 103 respectively. Specifically, regular flashing of an LED indicates that the respective telephone line (101 or 103) is busy; fast flashing of an LED indicates that the respective telephone line (101 or 103) is being rung; steady illumination of an LED indicates that the respective line is selected after the respective button (410 or 414) is pressed (i.g. line 101 will be selected after button 410 is pressed).

In the idle state, PC 141 is on; PCIPL board 142 is active; relay 310 connects telephone set 104A to telephone line 101 via SLIC 312, communication channel circuitry 316 and high frequency interface circuitry 320; so that when picking up the handset of telephone set 104A, LED 404 typically turns on and a user can speak a service request to PC 141 immediately without speaking over a dialtone sound. By pressing button 410, the user can over-ride the default condition, which causes relays 310 and 311 to connect telephone set 104A to the telephone line (101 or 103) directly and enables the user to dial a telephone number manually. Relays 310 and 311 are controlled by PCIP control program 602 (see FIG. 6) and the firmware in PCIPA controller 314, which are responsive to button pushes, off-hook conditions, system state, and resource availability, such as availability of the audio communication channels. Some functions of PCIP control program 602 are distributed such that some control is in the various PCIP adapters (e.g. 102A–N). If PC 141 is turned off or otherwise not responding, controller 314 will control relays 310 and 311 to directly connect telephone set 104A to telephone line 101 or 103.

Figure 5:
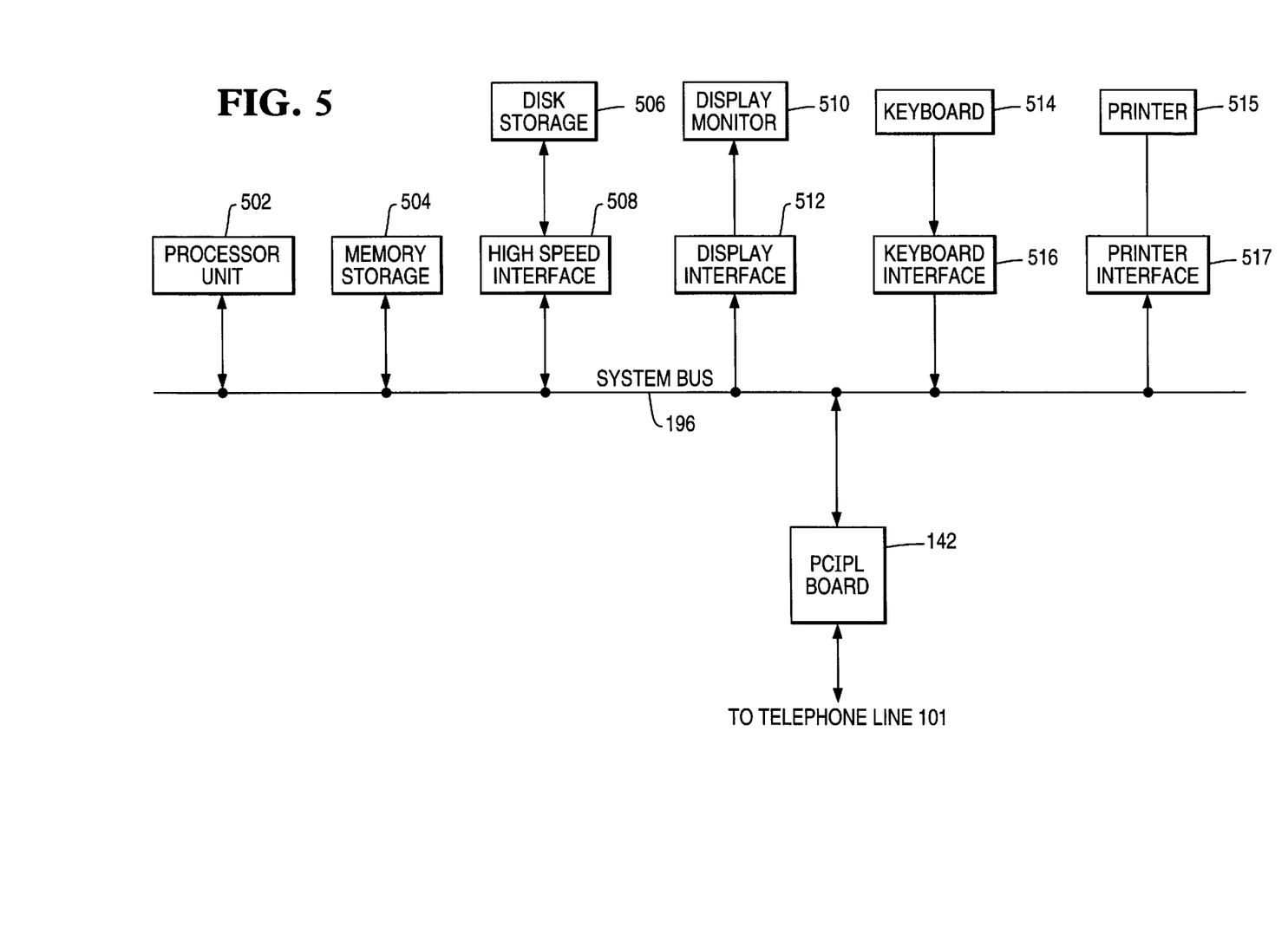
FIG. 5 shows a PC computer that can be used to control the operation of the PCIP system of FIG. 1, in accordance with the present invention.

Referring to FIG. 5, there is shown PC computer 141 of FIG. 1 in greater detail, in accordance with the present invention.

As shown in FIG. 5, PC 141 includes a system bus 196, a processor unit 502, a memory storage 504, a disk storage 506, a high speed interface 508, a display monitor 510, a display interface 512, a keyboard 514, a keyboard interface 516, a printer 515, and a printer interface 517.

Memory storage 504, coupled to the system bus, is able to store programs that consist of instructions and data.

Disk storage 506, coupled to the system bus via high speed interface 508, is also able to store programs. However, disk storage 506 has larger memory size than memory storage 504, while memory storage 504 has faster access speed than disk storage 506. The programs stored in disk storage 506 can be down loaded to memory storage 504.

Processor unit 502, coupled to the system bus, has the access to both memory storage 504 and disk storage 506. To perform a specific task, the processor unit is able to execute the programs stored in memory storage 504. The processor unit is also able to control the over all operation of the PC computer.

Display monitor 510, coupled to the bus via display interface 512, is able to provide visual interface between a user and the PC computer.

Keyboard 514, coupled to the system bus via a keyboard interface 516, is able to provide alphabetical and numerical input to the PC computer system.

Printer 515, coupled the system bus via printer interface 517, is able to print out results.

Figure 6:
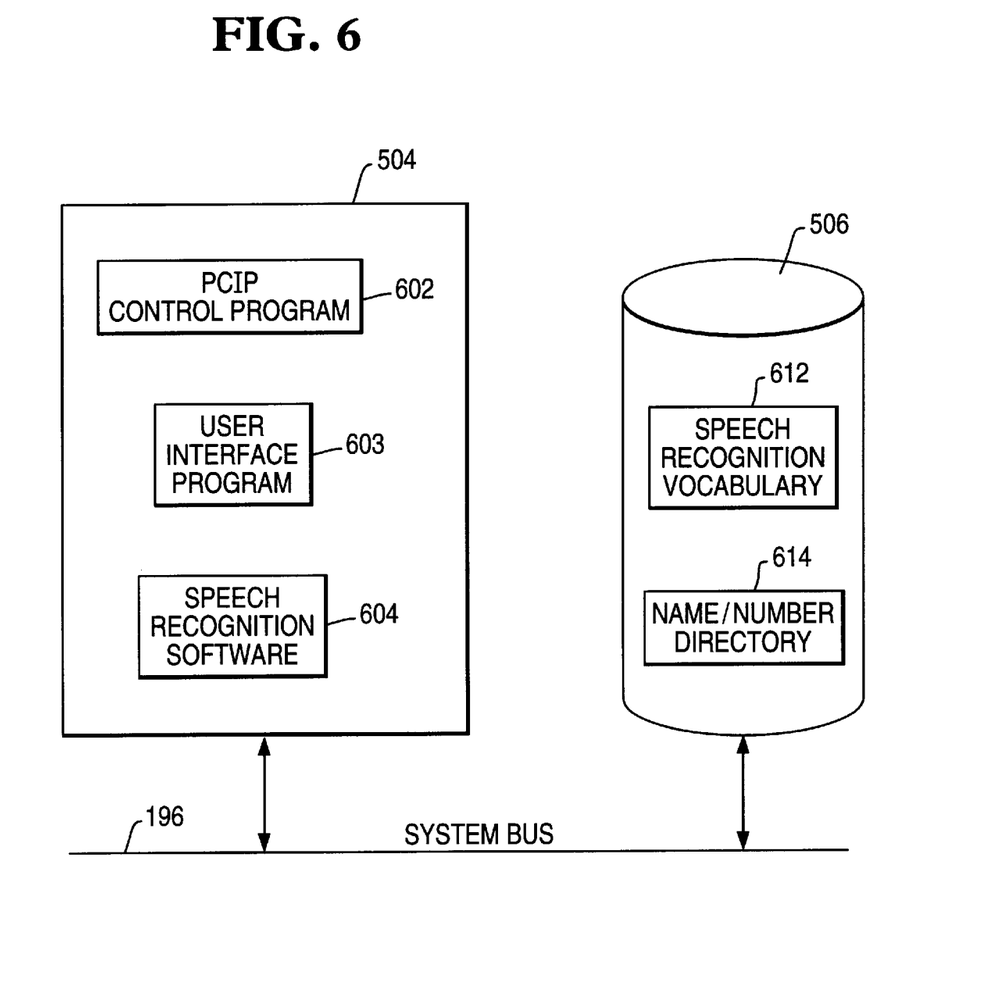
FIG. 6 shows the programs stored in memory storage and disk storage in FIG. 5.

Referring to FIG. 6, there is shown the executable programs stored in memory storage 504 during execution and the database files maintained in disk storage 506.

As shown in FIG. 6, executable programs stored in memory storage 504 include: PCIP control program 602, user interface program 603, and speech recognition software 604. Database files stored in disk storage 506 include: speech recognition (SR) vocabulary 612, and Name/Number directory 614.

PCIP control program 612 is able to maintain state information for the system and orchestrate responses to various stimulus. Stimulus's include button pushes, off-hooks, ring detect, etc. Responses include initiating database lookups, sending out control commands for establishing communication connections, etc. For example, if a PCIP adapter connected telephone has an off hook condition, control program 602 will be informed and it will send out commands on the control channel which will establish a communication channel. Furthermore, the control program will initiate speech recognition software 604 to "listen" to the appropriate communication channel. Specific examples are provided in the discussion of the flowcharts below.

Speech recognition software 604 is widely available. The PCIP system in the present invention does not require a particularly sophisticated capability. An example of an ASR application is WILDFIRE (call 800.WILDFIR for a practical demonstration and additional information). Examples of how speech recognition software 604 is used in this system are provided in the discussion of the flowcharts below.

SR Vocabulary 612 contains the digital representation of audio clips (in this case, spoken words relating to commands and names) that can be interpreted by speech recognition software 604. These digital representations are frequently referred to as wavefiles. The use of wavefile formats is known in the industry.

User interface program 603 provides a human interface via PC's display monitor 510, keyboard 514 and mouse 515.

It allows a user to install, configure, and customize his/her PCIP system. This is a typical capability for PC add-in software and hardware and will not be discussed further.

The Name/Number directory 614 stores persons' names and associated telephone numbers.

The databases and data in disk storage 506 can be read into memory storage 504, updated in the memory storage 504, and written back to disk storage 506.

Figure 7:
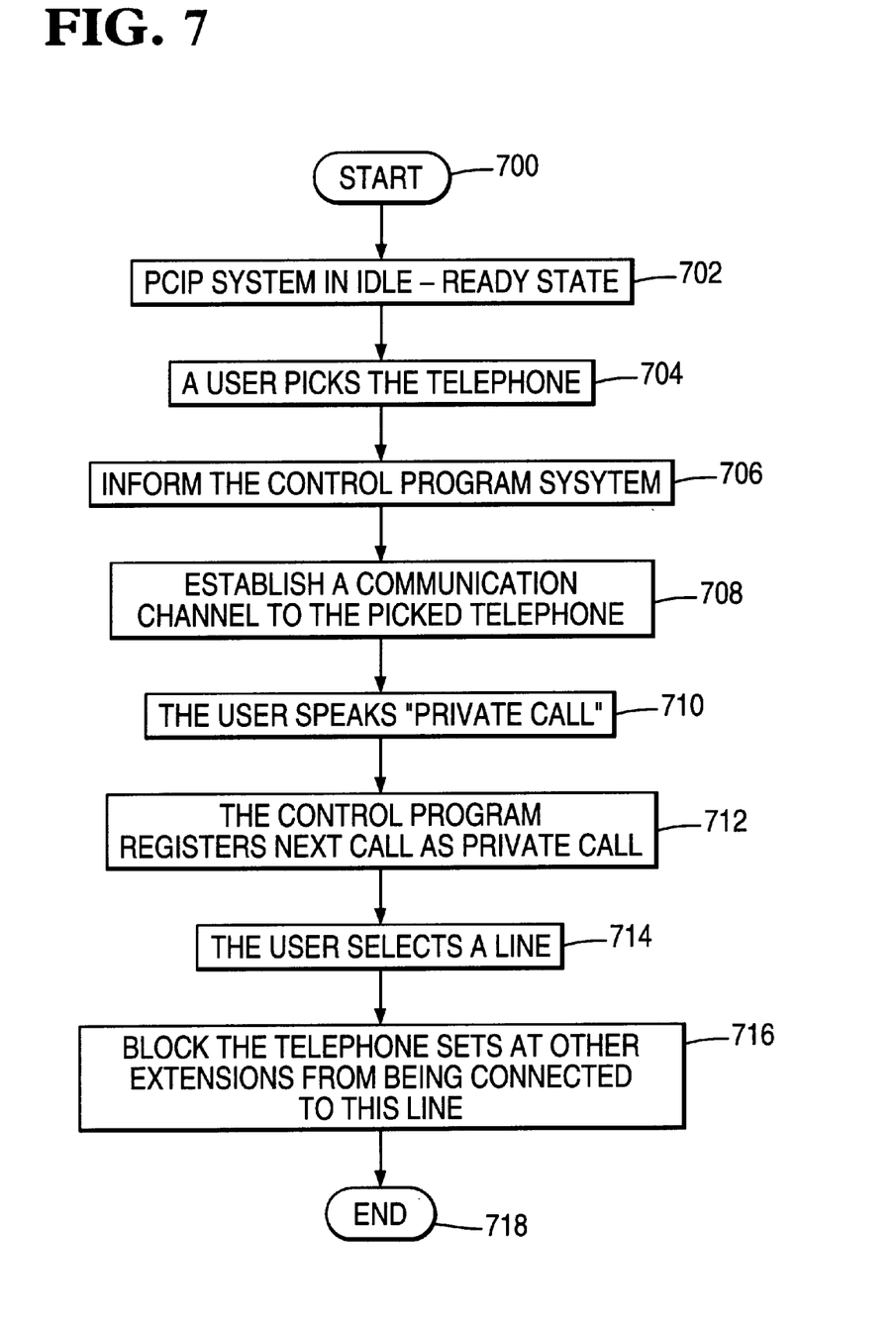
FIG. 7 shows a flowchart illustrating the operation for a user to dedicate a specific call to be a private call using the PC and the PCIP equipment, in accordance with the present invention.

Referring to FIG. 7, there is shown a flowchart illustrating the operation for a user to dedicate a specific call to be a private call using PC 141 and the PCIP equipment, in accordance with the present invention. This example describes a scenario in which the user wishes his/her telephone set to have sole access to a particular line, exclusive of other telephones in the home. This is increasingly important as more people use their phones for data calls that are easily disconnected by off-hooks at other phones in the home. In describing the operation shown in FIG. 7, it is assumed that the user initiates the operation at telephone set 104A equipped with adapter 102A. The other telephone sets (104B, . . . , 104N) can also be used to perform this operation.

As shown in FIG. 7, in step 702 PCIP system 100 is initially in an Idle-Ready state, which means: the PC LED 404 on adapter box 202A is ON (lighted), indicating that PC 141 is on and connected to adapter 102A; PCIPL board 142 is active; relay 310 on adapter 102A switches telephone set 104A to SLIC 312 (not directly to line 101 or 103). In this example, it is preferred that relay 310 is initially connected to SLIC 312 because the user must be able to speak commands to the PC immediately after picking up the handset of telephone 104A without speaking over a dialtone sound. Only then can SLIC 312 provide the capability of determining that the handset of telephone 104A has been lifted and that speech recognition software 604 should be initiated on the communication channel. The user always has the option of over-riding the default setting of relay 310 by pressing line button 410, which will result in a normal dialtone condition.

In step 704, the user picks up the handset of telephone 104A, and uses panel 329 on adapter box 202A to verify that the PC LED is ON so that the user knows that he/she can communicate verbally with PC 141 for PCIP related features. (On the other hand, if the user did not want to use the PCIP related features, he/she would press line button 410 or 414, see line LED 406 or 412 coming on, hear a normal dialtone, and dial the number manually.) At the PCIP adapter circuit level, when the handset is lifted, SLIC 312 detects Off-hook state and signals this state to controller 314.

In step 706, PCIPA controller 314 forms an information data packet corresponding to this newly generated Off-hook condition, and sends it to control program 602 at PC 141. With the embodiment shown in FIG. 3, this packet is sent from PCIPA controller 314, through: PCIPA control channel circuitry 318, PCIPA high frequency interface circuitry 320, house phone wire 101, PCIPL high frequency interface circuitry 352, PCIPL control channel circuitry 350, and to PCIPL controller 346.

In step 708, after receiving the "handset change of condition" information packet associated with PCIP adapter 102A, PCIP control program 602 communicates with all PCIP adapters (102A, 102B, . . . , 102N) using the control channel, to establish a single bi-directional communication channel between PCIP adapter 102A and PCIPL board 142 (other PCIP adapters, e.g. 102B, 102N, in the system must have their communication channel transmitters turned off). The PCIP control program invokes speech recognition software 604, which then begins monitoring the communication channel to interpret audio to discern known audio patterns.

In step 710, after picking up the handset of telephone 104A, the user speaks "private call". (This example assumes that the prior setup activity happens quickly enough that the user does not need to be prompted). With the embodiment shown in FIG. 3, this two word audio clip is sent through SLIC 312, PCIPA communication channel circuitry 316, PCIPA high frequency interface circuitry 320, house phone wire 101, PCIPL high frequency interface circuitry 352, PCIPL communication channel circuitry 348, CODEC processor 344, and to speech recognition software 604 for processing.

Specifically, at PCIP adapter circuit level, SLIC 312 converts 2-Wire audio from telephone set 104A of "private call" to appropriately biased audio to send to communication channel circuitry 316. Communication channel circuitry 316 converts analog "private call" to a high frequency modulated signal that is transmitted throughout the home on the communication channel which uses house phone wire 101 or wireless carrier.

Communication channel circuitry 348 on PCIPL board 142 recovers the "private call" signal and converts it to analog and sends it to CODEC processor 344. The CODEC processor digitizes the audio and passes the wavefile to PC 141 over PC system bus (or PC Internal Bus) for speech recognition processing.

In step 712, after receiving the wavefile, speech recognition software 604 on PC 141 uses algorithms to recognize speech. In this case, the speech recognition software recognizes the command "private call". Control program 602 on PC 141 registers and will process the next call sent to or originated from telephone set 104A as a private call, and will block disruptions from the telephone sets at any other extensions.

In step 714, the user activates (i.e. presses) line button 410. PCIPA controller 314 detects the activation of line button 410 via human interface circuit 309 and generates signals to control relays 310 and 311, to connect telephone set 104A to line 101 (provided there is no call in progress on line 101). At this time, the user can place or receive a call via line 101.

In step 716, if a second user at a different extension presses line button 410 on his/her adapter box, the control program 602 will not send out control signal to connect that respective telephone set to line 101. Instead, control program 602 will send a wavefile to the second user. The wavefile will be played over the speaker on his/her adapter box, announcing that "This line selection has been denied, a private call is in progress".

After the private call has been hung up, PCIPA controller 314 forms an information data packet corresponding to this newly generated Hung-up condition and sends this information data packet to control program 602, which terminates the private call and releases line 1.

Figure 8:
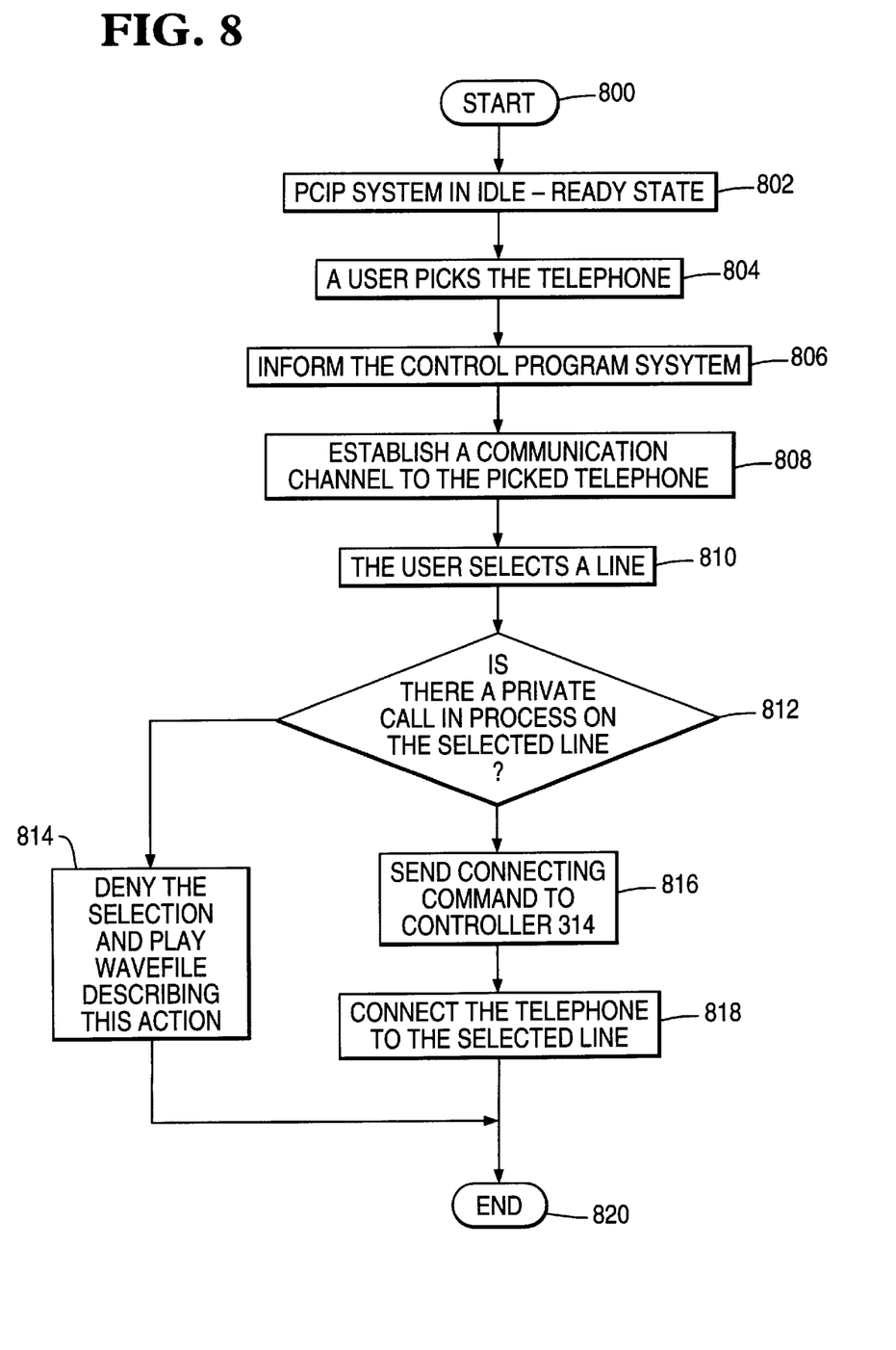
FIG. 8 shows a flowchart illustrating the operation for a user to select a telephone line and place a call using the PC and the PCIP equipment, in accordance with the present invention.

Referring to FIG. 8, there is shown a flowchart illustrating the operation for a user to select a telephone line and place a call via the selected telephone line using PC 141 and the PCIP equipment, in accordance with the present invention. This example clarifies how a standard phone can be used in a multiline system. In describing the operation shown in FIG. 8, it is assumed that the user initiates the operation at telephone set 104A equipped with adapter 102A.

In step 802, PCIP system 100 is initially in an Idle-Ready state, as described in step 702.

In step 804, the user picks up the handset of telephone 104A, and uses panel 329 on adapter box 202A to verify that the PC LED is ON so that the user knows that PC 141 can control the operation.

In step 806, upon detecting the newly generated off-hook condition, PCIPA controller 314 forms an information data packet, and sends it to control program 602 at PC 141. With the embodiment shown in FIG. 3, this packet is sent from PCIPA controller 314, through: PCIPA control channel circuitry 318, PCIPA high frequency interface circuitry 320, house phone wire 101, PCIPL high frequency interface circuitry 352, PCIPL control channel circuitry 350, and to PCIPL controller 346.

In step 808, after receiving the "handset change of condition" information packet associated with PCIP adapter 102A, PCIP control program 602 communicates with all PCIP adapters (102A, 102B, . . . , 102N) using the control channel, to establish a single bi-directional communication channel between PCIP adapter 102A and PCIPL board 142 (other PCIP adapters, e.g. 102B, . . . , 102N, in the system must have their communication channel transmitters turned off).

In step 810, the user activates (by pressing) line button 414 to select telephone line 103. In response to the activation, PCIPA controller 314 forms a packet to request that telephone set 104A be connected to line 103, and sends the packet to control program 602 at PC 141. With the embodiment shown in FIG. 3, this packet is sent through PCIPA control channel circuitry 318, PCIPA high frequency interface circuitry 320, house phone wire 101, PCIPL high frequency interface circuitry 352, PCIPL control channel circuitry 350, PCIPL controller 346, and to control program 602 for processing.

In step 812, control program 602 on PC 141 determines whether the selected line (103) is being dedicated to a private call which is in progress. If the selected line is being dedicated to a private call which is in progress, the operation is led to 814, in which control program 602 sends a wavefile to PCIP adapter 104A. This wavefile is played over speaker 308, announcing that "This line selection is denied, a private call is in progress on the selected line". If the selected line is not being dedicated to a private call, the operation is led to step 816.

In step 816, control program 602 sends a command to PCIPA controller 314 to connect telephone set 104A to line 103. With the embodiment shown in FIG. 3, this command is sent through: PCIPL controller 346 (where the command is converted to a network data packet), PCIPL control channel circuitry 350, PCIPL high frequency interface circuitry 352, house phone wire 101, PCIPA high frequency interface circuitry 320, PCIPA control channel circuitry 318, and to PCIPA controller 314.

In step 818, in response to the information data packet, PCIPA controller 314 generates control signals to energize relays 310 and 313 to connect telephone set 104A to telephone line 103. At this time, the user can hear a dial tone from the telephone set 104A and place a call via telephone line 103.

Figure 9:
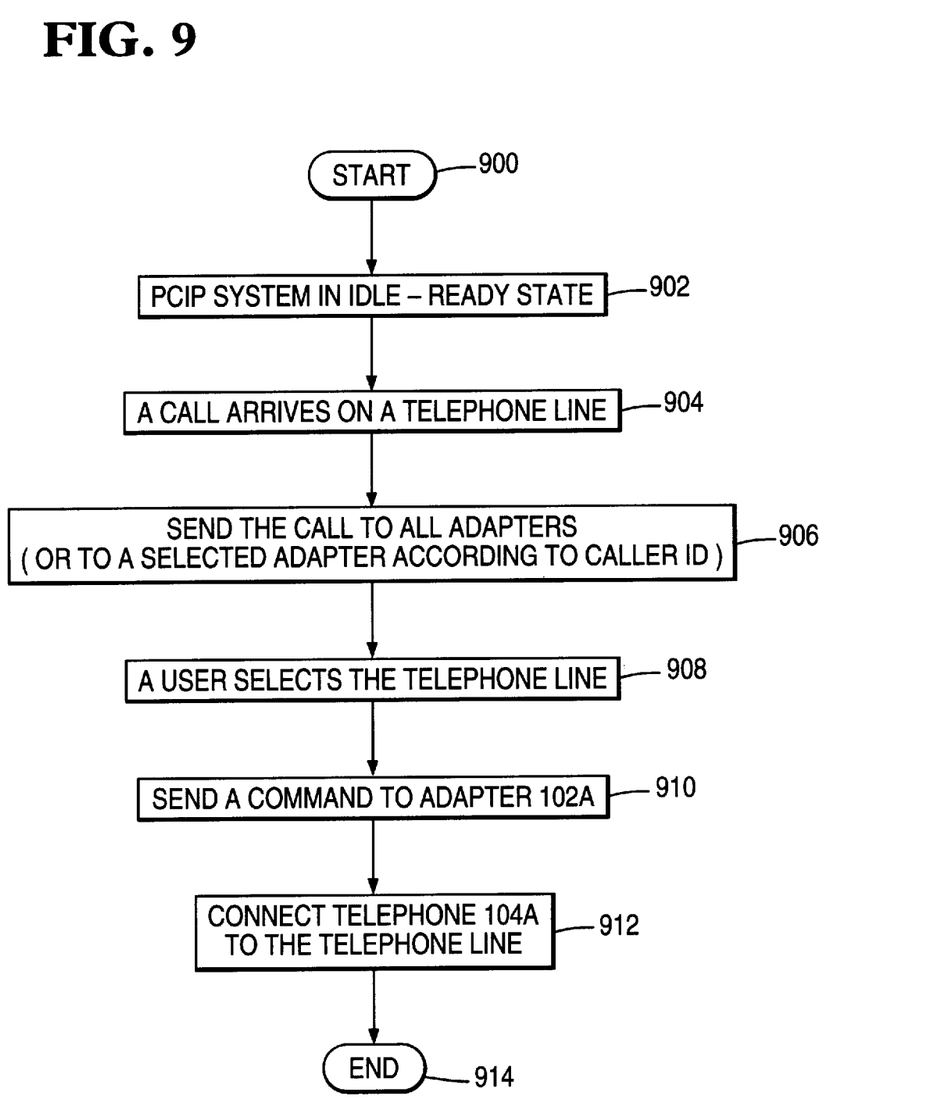
FIG. 9 shows a flowchart illustrating the operation for a user to select a telephone line and answer an incoming call using the PC and the PCIP equipment, in accordance with the present invention.

Referring to FIG. 9, there is shown a flowchart illustrating the operation for a user to select a telephone line and to answer an incoming call via the selected telephone line using PC 141 and the PCIP equipment, in accordance with the present invention. In describing the operation shown in FIG. 9, it is assumed that the user uses telephone set 104A to answer the incoming call.

In step 902, PCIP system 100 is initially in an Idle-Ready state, as described in step 702.

In step 904, an incoming call arrives at telephone line 103.

In step 906, in response to the incoming call, control program 602 sends commands to PCIPA controllers in all PCIP adapters (102A, 102B, . . . , 102N) using the control channel, to create ring bursts at all speakers and to fast flashing sequencing at LEDs 412 (or to the controller in a selected adapter, i.e. adapter 102A, according to the caller ID in the incoming call).

In step 908, the user picks up telephone 104A and activates (by pressing) line button 414 to select telephone line 103. In response to the activation, PCIPA controller 314 forms a packet to request that telephone set 104A be connected to line 103, and sends the packet to control program 602 at PC 141. With the embodiment shown in FIG. 3, this packet is sent through PCIPA control channel circuitry 318, PCIPA high frequency interface circuitry 320, house phone wire 101, PCIPL high frequency interface circuitry 352, PCIPL control channel circuitry 350, PCIPL controller 346, and to control program 602 for processing.

In step 910, control program 602 sends a command to PCIPA controller 314. With the embodiment shown in FIG. 3, this command is sent through: PCIPL controller 346 (where the command is converted to a network data packet), PCIPL control channel circuitry 350, PCIPL high frequency interface circuitry 352, house phone wire 101, PCIPA high frequency interface circuitry 320, PCIPA control channel circuitry 318, and to PCIPA controller 314.

In step 912, in response to the information data packet, PCIPA controller 314 generates control signals to energize relays 310 and 313 to connect telephone set 104A to telephone line 103. At this time, the user can answer the incoming call on telephone line 103 from the telephone set 104A.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

What is claimed is:

1. An in house system for managing access to multiple pre-existing communication lines using a plurality of communication devices, the apparatus comprising:

a central controller coupled to one of the multiple communication lines for controlling the communication devices and managing access by each of the plurality of communication devices to the multiple communication lines;

a plurality of switching circuits each coupled between one of the plurality of communication devices and the multiple communication lines for automatically connecting one of the communication devices to any one of the multiple communication lines wherein each of the multiple communication lines can simultaneously carry communication signals for different users; and a user panel for indicating status to a user and for sending service requests to said controller, wherein said panel indicates whether a communications link has been established between one of said communication devices and said controller, if any of the multiple communication lines are busy, and a selection of an available telephone line by a user.

2. The system of claim 1, further comprising:

a receiving circuit, coupled between one of said plurality of switching circuits and the one communication line, for receiving said commands from said controller via the one communication line and for sending said commands to said controller.

3. The system of claim 1, further comprising:

a transmitting circuit, coupled between one of said plurality of switching circuits and the one communication line, for transmitting status to said controller via the one communication line.

4. An in house system for selecting a communication line from multiple communication lines, each of the multiple communication lines being coupled to a plurality of communication devices, the system comprising:

a central controller, coupled to one of the communication lines for controlling the communication devices based on operational status of the communication lines;

a plurality of switching circuits each coupled between one of the communication devices and the multiple communication lines for automatically connecting one of the communication devices to any one of the communication lines wherein each of the multiple communication lines can simultaneously carry communication signals for different users; and a plurality of line selecting control circuits, each coupled to one of the communication devices and each of the communication lines, for generating a request to select one of the communication lines so that the communication device can be connected to the selected one communication line;

wherein, in response to said request, said controller allows and denies an access to the selected one communication line from other of the communication devices based on the operational status of the selected one communication line.

5. The apparatus of claim 4, wherein said controller denies the access to the selected one communication line when a call is in progress on the selected one communication line.

6. The system of claim 4, further comprising:

a receiving circuit, coupled between one of said plurality of switching circuits and the one communication line, for receiving said commands from said controller via the one communication line and for sending said commands to said controller;

a transmitting circuit, coupled between one of said plurality of switching circuits and the one communication line, for transmitting status to said controller via the one communication line;

wherein said receiving circuits and said transmitting circuits operate at a high frequency and said communication devices operate at an audio frequency on the same communication line such that each of the pre-existing communication lines can carry both commands and communication signals without interfering with each other.

* * * * *